Dec. 4, 1962  R. W. JESSON  3,066,901

GOLFERS' PORTABLE SEAT ACCESSORY

Filed June 12, 1961

INVENTOR.
RALPH W. JESSON
BY
Christie, Parker & Hale
ATTORNEYS.

United States Patent Office 3,066,901
Patented Dec. 4, 1962

3,066,901
GOLFERS' PORTABLE SEAT ACCESSORY
Ralph W. Jesson, 8006 Jovenita Canyon Road,
Los Angeles 46, Calif.
Filed June 12, 1961, Ser. No. 116,392
1 Claim. (Cl. 248—205)

This invention relates to a golfers' seat accessory. More particularly, it relates to an article adapted for engagement with the wheel of a caddy cart to provide a seat for the golfer while awaiting a turn at putting or teeing off.

Devices known as "kangaroo seats" have been used for a number of years by spectators at various sporting events. Such devices are characterized by a single pole having a collapsible frame and a fabric seat at one end. When in use the seat is opened and the person merely rests against the stick engaged with its other end in the ground.

These kangaroo seats are used by some individuals during golfing, particularly while waiting teeing off or awaiting their turn at putting. The disadvantage with such kangaroo seats is that they are cumbersome and heavy. Moreover, they inflict damage to the ground, particularly to the carefully tended green fringe. Most golfers usually appreciate the opportunity to sit down at various times during a round of golf, and not all golf courses provide seats at the tee and very few provide seats in proximity to a green.

An extreme provision of a seat for a golfer resides in the electric or gasoline-powered carriage. These vehicles are expensive to rent, cannot be taken close to the green or tee in most instances, and thus do not provide seating when and where it is particularly desired. However, the manually pulled or pushed golf bag caddy cart is capable of being towed to proximity to the green or tee and can, by practice of this invention, be used to provide a seat for a golfer.

This invention provides a small lightweight accessory which is adapted to provide a seat when used in conjunction with a manually motivated caddy cart. When in movement from tee to green this accessory of this invention can be conveniently carried clipped to the golf bag or caddy cart. Furthermore, this invention provides such a golfers' seat accessory which is inexpensive and simple beyond the characteristics of those devices currently provided.

Generally speaking, this invention comprises a golfers' seat accessory for use in engagement with the wheel of a golf bag cart. The accessory comprises a seat element having spaced apart parallel means extending from one side of the seat element for engaging a wheel of the golf bag cart. Further, the invention comprises means engaging the circumference of the wheel for stabilizing the seat element into a substantially horizontal condition. Additionally, the accessory includes means adjusting the wheel circumference engaging means to assure usefulness of the invention on the different sized wheels of caddy carts currently available. The invention further includes means for engaging the accessory to a golf bag or caddy cart when the accessory is not in use.

The following detailed description and explanation of this invention is made in conjunction with the accompanying figures, wherein.

Figure 1:
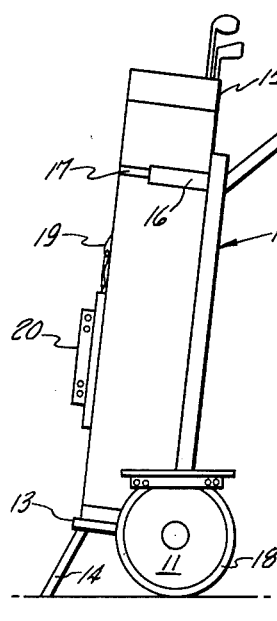
FIGURE 1 is a side elevation of a caddy cart and golf bag with the golfers' accessory of this invention supported on the golf bag.

Referring to the figures, a golf cart 10 having a pair of wheels 11 at its lower end and a towing handle 12 at its upper end is illustrated in FIGURE 1. A golf bag rack 13 is provided at the lower end of the cart 10 and includes a pedestal 14 for stabilizing the cart 10 in a vertical position. A golf bag 15 is secured to the cart 10 by means of a yoke 16 and strap 17 adjacent the handle 12. Each of the wheels 11 includes a tire 18. The golfers' seat accessory 20 provided by this invention is secured to a loop 19 on the golf bag.

Figure 2:
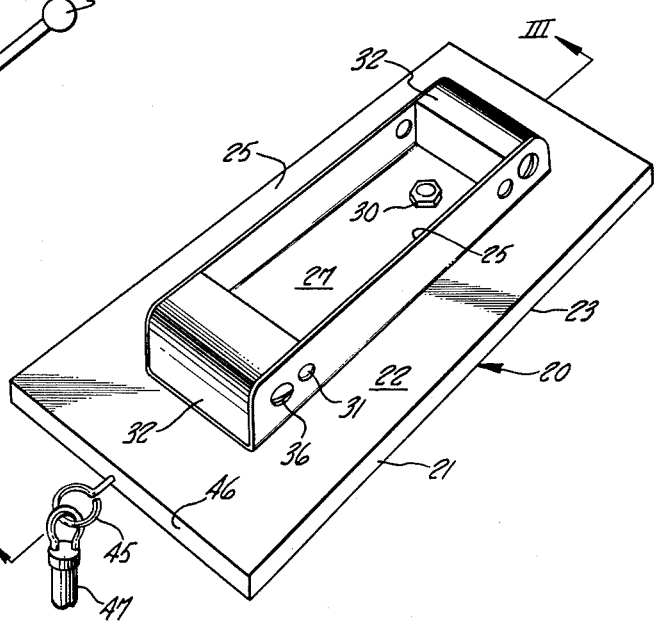
FIGURE 2 is a perspective view of the under side of the accessory illustrating the golf cart wheel wall and circumference engaging means.
Figure 3:
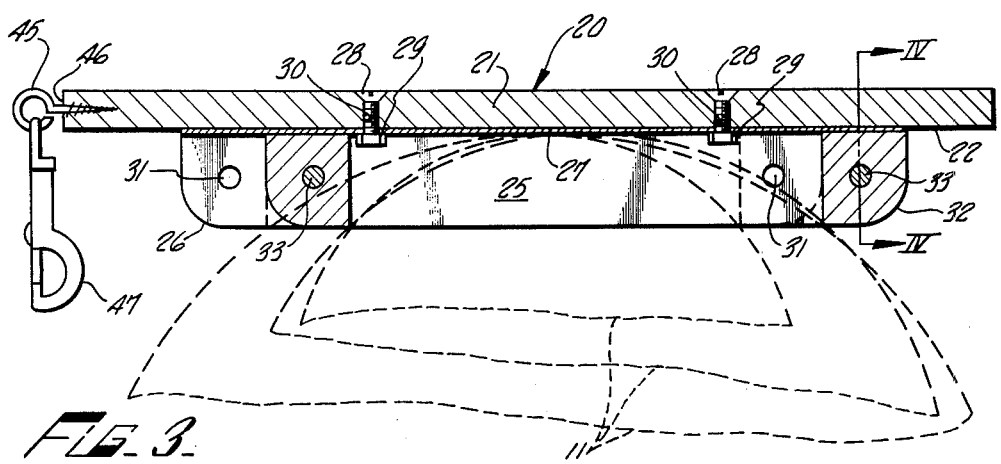
FIGURE 3 is a longitudinal cross-sectional view of the accessory taken along line III—III of FIGURE 2.
Figure 4:
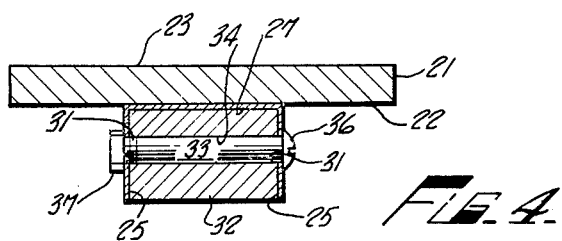
FIGURE 4 is a transverse cross-sectional view taken along line IV—IV of FIGURE 3 illustrating the adjustable nature of the wheel circumference blocks relative to the wheel wall engaging means.

Referring particularly to FIGURES 2 and 3, the seat article 20 comprises a seat element 21 having an underside 22 and an upper side 23. The upper surface 23 of the seat member 21 provides the actual seating surface for a golfer and in a preferred form of the invention is planar.

A pair of parallelly disposed spaced apart wheel engaging members 25 are provided on the underside 22 of the seating element longitudinally thereof. In a preferred form of this invention, the wheel or tire wall engaging members 25 take the form of flanges of a channel element 26 having the web 27 of the channel 26 secured against the underside 22 of the seat element 21 by bolts or screws 28 and bolts 29. A pair of apertures 30 are provided in the web 27 of the channel 26 to receive the threaded end of the screws 28. Ideally, the heads of the screws 28 are countersunk flush with the upper surface 23 of the seat element 21. For optimum seat securing efficiency, the oppositely disposed wheel engaging surfaces 25 are perpendicular to the upper surface 23 of the seat element 21. While the wheel engaging surfaces 25 are desirably provided by the channel member 26, this invention also contemplates a seat article molded integrally from plastic or the like which provides the surfaces 25 as a part of the seat portion 21.

A pair of apertures 31 are provided in each end of each of the flanges 25 of the channel member 26. A block or seat stabilizing member 32 is positioned between the oppositely disposed tire wall engaging surfaces 25 at each end of the channel 26 and is secured relative to the surfaces 25 by bolts 33 passing through the apertures 31 and a hole 34 drilled through each of the blocks 32. The bolt 33 is secured at one end to the exterior side of the flange by a nut 37. The seat stabilizing block means 32 engage the circumferential surface 39 of wheel tire 19 of the caddy cart 10.

When a golfer desires to use the seat 20 provided by this invention, he need merely position the article 20 on the top portion of one of the wheels 11 of the caddy cart with the tire 18 of the wheel 11 frictionally engaged between the oppositely disposed tire wall engaging surfaces 25. The stabilizing blocks 32 are positioned in the proper apertures 31 to engage the circumferential surface 39 of the tire engaged between the surfaces 25. In this manner, because of the frictional engagement between the tire 18 and the surfaces 25, the seat 20 is held to the wheel 11. The blocks 32 provide stabilization of the seat 20 to prevent tipping of the seat relative to the wheel 11. The wheel 11 provides proper spacing of the seat 20 from the ground. When used in the manner described the load on the wheel is vertical preventing the creation of a tipping moment on the cart 10.

Commonly, caddy carts are available in a variety of styles. It has been found by experience that three different diameters of wheels occur in these various caddy carts. For this reason the plurality of apertures 30 is provided so that one basic seat 20 is adaptable to any of these caddy carts 10. Thus, a golfer owning a seat 20 provided by this invention can use the seat effectively on carts rented from different golf courses merely by adjusting the stabilizer blocks 32 in the proper one of the three conditions (see FIGURE 3) relative to the channel 26. While the adjustability of the stabilizer blocks 32 is provided in a preferred form of the invention by the plurality of distinct apertures 31, the equivalent of the pair of apertures 31 at each end of each flange 25 of the channel 26 may be provided by an elongated slot parallel to the web 27 of channel 26; such would not amount to a departure from the scope of this invention.

A screw eyelet 45 is provided in one end 46 of the seat element 21. This procedure is most practical when the seat portion 21 is fabricated from a sheet of wood. However, the eyelet may be molded integrally from plastic when the seat 20 is so fabricated. A snap-hook 47 is engaged with the eyelet 45 and provides means for securing the seat 20 to the loop 19 of the golf bag 15 when the caddy cart is being towed during a round of golf.

While the invention has been described above in conjunction with specific structural embodiments, it is emphasized that this has been by way of example only and is not intended as a limitation of the scope of this invention.

I claim:

A golfer's seat accessory for engagement with a wheel of a golf bag cart comprising a seat element having a planar upper surface, spaced apart parallel cart wheel wall engaging means extending substantially perpendicularly from the lower surface of the seat element for frictional engagement with the wheel, wheel circumference engaging means secured between the wheel wall engaging means at spaced apart locations therealong for stabilizing the seat element, means for securing the circumference engaging means in a plurality of spaced apart locations corresponding to different wheel diameters and comprising a pair of nut and bolt combination engageable to the wheel wall engaging means through the circumference engaging means, and means on the seat element for hanging the accessory on the golf bag or the like when the cart is in motion.

References Cited in the file of this patent
UNITED STATES PATENTS

| | | |
|---|---|---|
| 1,344,376 | Brodin | June 22, 1920 |
| 2,610,072 | Head | Sept. 9, 1952 |
| 2,673,589 | Kunkel | Mar. 30, 1954 |
| 2,772,720 | Zody | Dec. 4, 1956 |
| 2,800,950 | Chamberlin | July 30, 1957 |